United States Patent Office 3,620,149
Patented Nov. 16, 1971

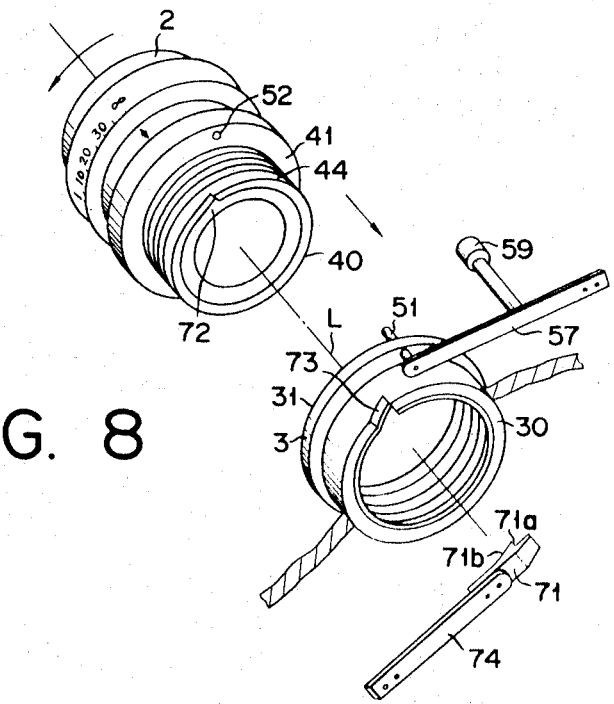
FIG. 8
FIG.9A  FIG.9C
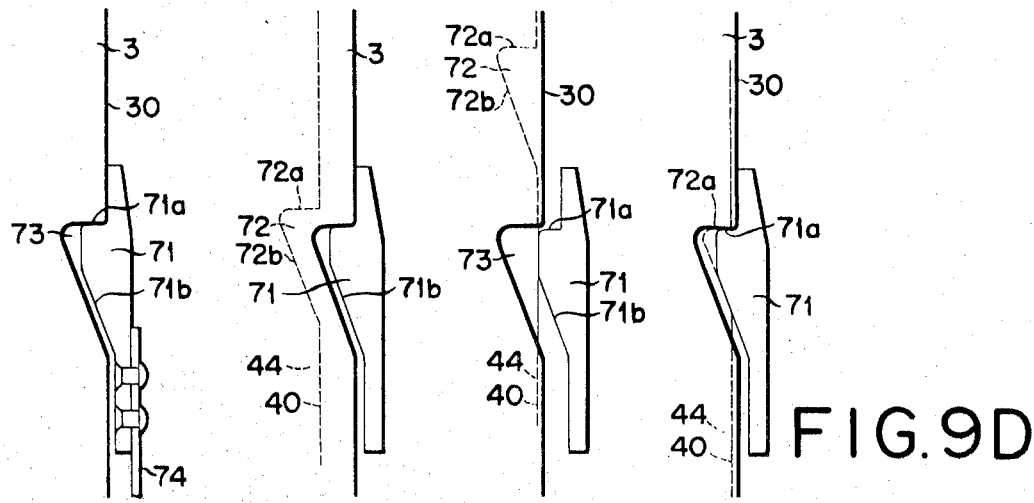
FIG.9B  FIG.9D

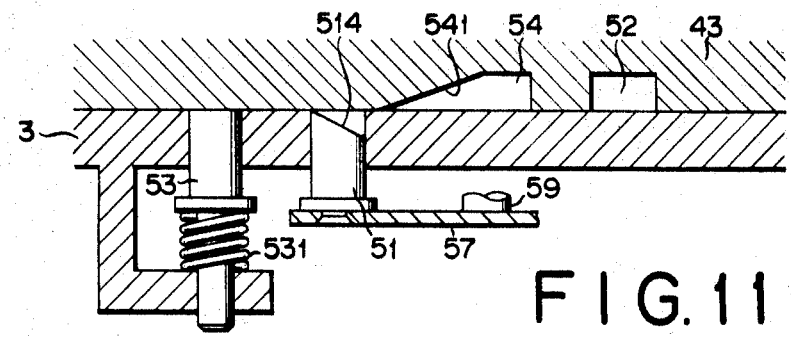
FIG. 11B
FIG. 11A
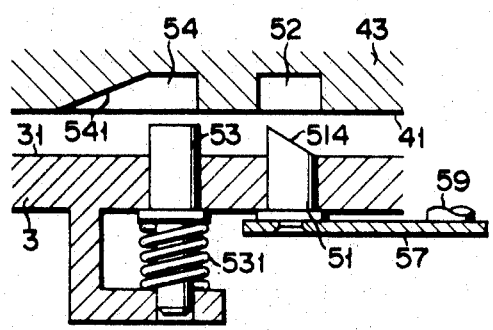
FIG. 11E
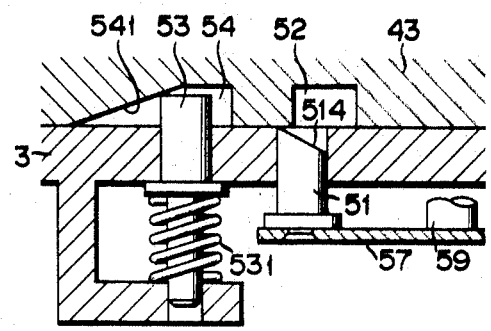
FIG. 11C
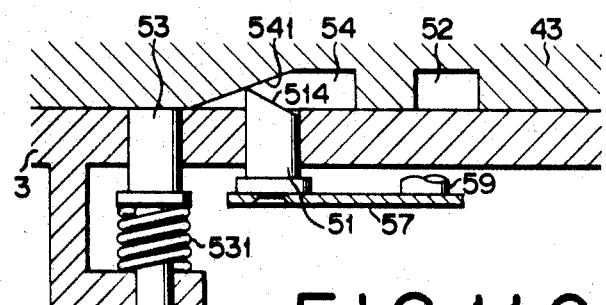
FIG. 11F
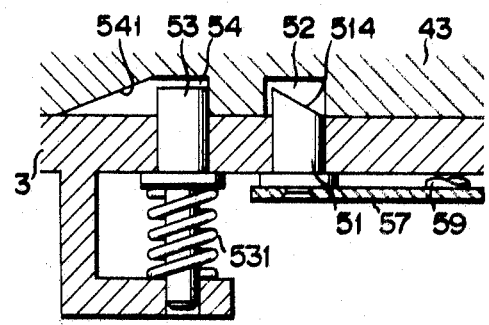
FIG. 11D
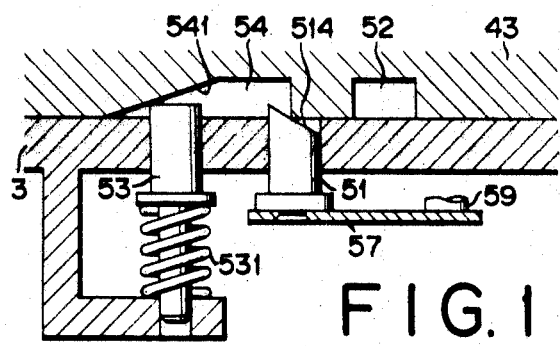

3,620,149
THREADED TYPE COUPLING DEVICE FOR COUPLING A LENS BARREL WITH A CAMERA BODY
Akira Ogihara, Tokyo, Japan, assignor to Olygin Optical Corporation, Tokyo, Japan
Filed July 31, 1970, Ser. No. 60,077
Claims priority, application Japan, Aug. 4, 1969, 44/61,207, 44/88,256; Aug. 18, 1969, 44/64,844; Dec. 28, 1969, 44/123,736
Int. Cl. G03b 3/00
U.S. Cl. 95—44 R          6 Claims

ABSTRACT OF THE DISCLOSURE

In a threaded type coupling device for coupling a lens barrel with a camera body, either of the lens barrel and camera body is provided with an independent threaded cylindrical member contained therein to be movable axially but not in the circumferential direction, and the independent threaded cylindrical member is resiliently urged back from the other of the lens barrel and camera body so as to cause them to abut on each other a little before the predetermined relative axial and circumferential position is reached. Further, a stop mechanism is provided for locking the lens barrel and camera body against relative rotation when they are coupled at said predetermined point.

BACKGROUND OF THE INVENTION

This invention relates to a threaded type coupling device for coupling a lens barrel with the body of a camera, and more particularly to a device for correctly coupling the lens barrel at a predetermined axial and circumferential position with respect to the body so as to include an interlocking mechanism for transmitting the angular displacement.

Various types of devices for coupling and decoupling the lens barrel to and from the camera body have been proposed for cameras of the lens interchanging type, and these prior devices can be classified into the threaded type and the bayonet type. When compared with the bayonet type the threaded type is advantageous in that its construction is simpler, can be manufactured more easily at less cost so that the latter type is used extensively. However, the known threaded type coupling devices have some drawbacks. That is, unless tightened sufficiently, the conventional threaded type coupling device may become loosened due to turning operation of the focusing ring. Further, the coupling of a replaced lens on the camera body in a correct axial and peripheral position requires so precise work as is practically impossible at the manufacturing stage. In addition, the axial and circumferential position of the actually coupled lens barrel varies due to the wear of screw threads during long use time or according to the magnitude of a force with which the lens barrel is coupled on the camera body.

For this reason, where the threaded type coupling device is used, it has been impossible to use an interlocking mechanism for transmitting the angular displacement, for example of a diaphragm or shutter presetting ring contained in the lens barrel, to an exposure meter located on the camera body.

SUMMARY OF THE INVENTION

It is an object of this invention to provide a novel threaded type coupling device which can set and maintain lens barrel of different type at a predetermined axial and cricumferential position.

According to this invention there is provided a threaded type coupling device for coupling a lens barrel with a camera body wherein either of the lens barrel and camera body is provided with an independent threaded cylindrical member contained therein to be movable axially but not in the circumferential direction, said independent threaded cylindrical member is resiliently urged back from the other of said lens barrel and said camera body so as to cause the lens member and camera body to abut on each other and attain the predetermined relative axial position a little before the predetermined relative circumferential position is reached and wherein a stop means is provided for locking said lens barrel and said camera body against relative rotation when they are coupled at said predetermined point.

In this manner, the lens barrel can be coupled to the camera body precisely at the predetermined axial and circumferential position so that it is possible to provide an interlocking mechanism between the lens barrel and the camera body to transmit the circumferential movement of a member or members of the former to the latter. For example it is possible to interlock an iris diaphragm or a shutter adjusting mechanism contained in the lens barrel with an exposure meter on the body.

It is also possible to couple the camera body or lens barrel embodying this invention with a prior art lens barrel or camera body thus increasing mutual interchangeability.

BRIEF DESCRIPTION OF THE DRAWINGS

FIG. 8 is an exploded view of the embodiment shown in FIG. 7;

FIGS. 9A to 9D are partial side views to explain the operation of the embodiment shown in FIGS. 7 and 8;

FIGS. 11A to 11F are partial sectional views to explain the construction and operation of still another stop mechanism.

DESCRIPTION OF THE PREFERRED EMBODIMENTS

Figure 1:
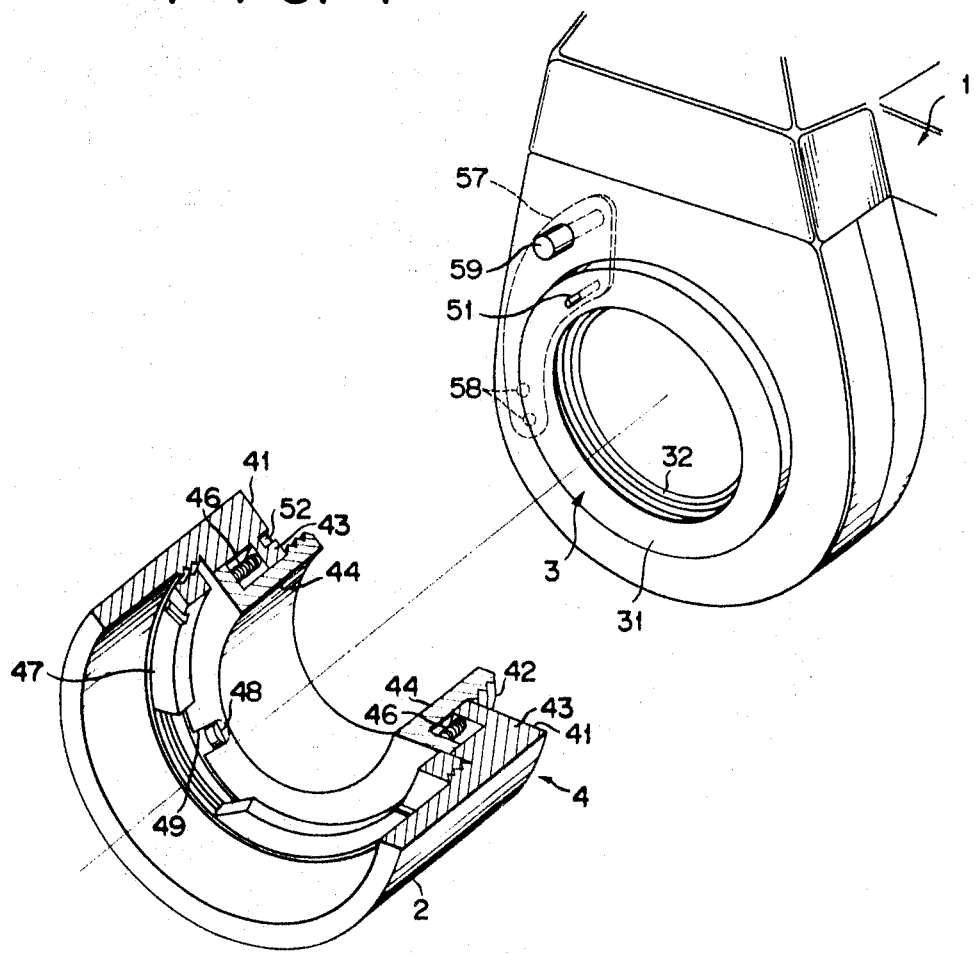
FIG. 1 is an exploded perspective view, partly in section, of one embodiment of this invention.

FIG. 1 shows the novel coupling device as applied to a conventional single lens reflex type camera. A body side portion 3 of the coupling device is secured to a camera body 1. Portion 3 has a cylindrical bore having screw threads 32 formed on the inner periphery of the bore and a front flat abutting surface 31 which is normal to the optical axis of the camera and functions to receive a lens barrel side coupling portion to be described later. A pin 51 is slidably mounted on the body side portion 3 to project outwardly from the abutting surface 31, the extent of projection being selected to be less than one pitch of the screw threads, by means of a leaf spring 57 which is secured at one end to the body side portion 3 to engage at the other end with pin 51. The other or free end of the leaf spring 57 also carries a releasing button 59, which is urged by said spring 57 to project outside of the body side portion 3. Thus upon depression of the releasing button 59, the pin 51 is retracted into portion 3.

Figure 2:
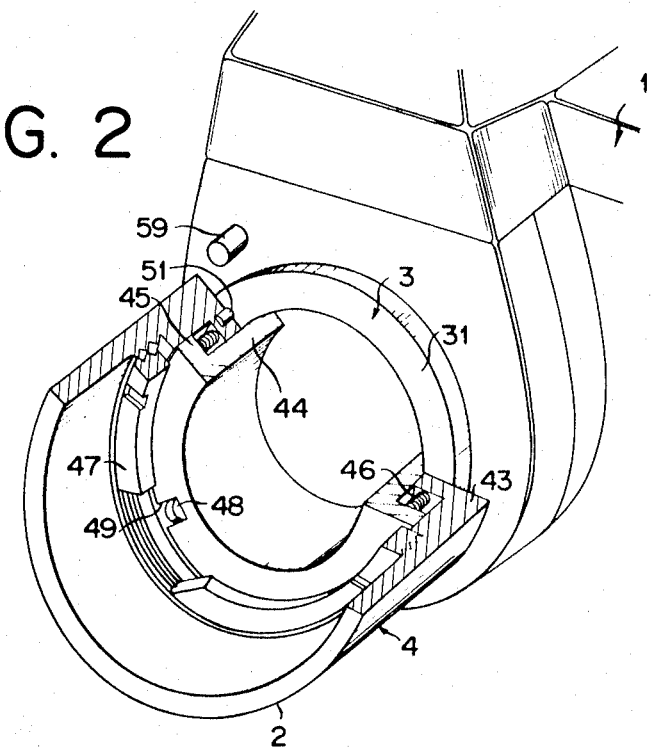
FIG. 2 is a perspective view, partly in section, of the lens barrel and camera body after coupling.

As shown in FIGS. 1 and 2 a lens barrel portion 2 comprises an outer cylindrical member 4 having an inwardly projecting flange 43 at its rear end. The flange 43 has an abutting surface 41 which is to be abutted against abutting surface 31. Portion 2 further comprises an inner cylindrical member 44 provided with screw threads 42 on the outer periphery to be received in screw threads 32 and the inner cylindrical member 44 is telescoped in the outer cylindrical member 4. The inner cylindrical member 44 is provided with an outwardly projecting flange 45. One or more coil springs 46 are interposed between flanges 43 and 45 to resiliently hold inner cylindrical member 44 in the outer cylindrical member 4. Further as shown in FIG. 1, an annular stop ring 47 is threadedly received in the outer cylindrical member 4 so as to normally engage the outer surface of flange 45 of the inner cylindrical member 44 which is biased by coil springs 46. Flange 45 is formed with a notch 49 to accommodate a pin 48 secured to the outer cylindrical member 4 to prevent relative rotary motion of inner and outer cylindrical members.

A hole 52 is formed in the abutting surface 41 to cooperate with pin 51 when the lens barrel portion 2 is coupled to the body side portion 3.

Although not shown in the drawings, as in the conventional camera, the lens barrel portion 2 is provided with an iris diaphragm which is interlocked with an exposure meter and a release button on the camera body 1.

Figure 3A:
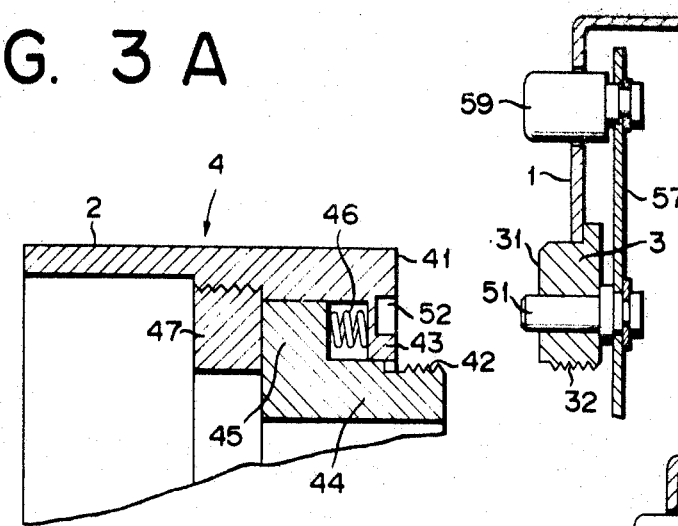
FIGS. 3A to 3C are partial sectional views of the coupling device shown in FIGS. 1 and 2 to explain the operation thereof.
Figure 3B:
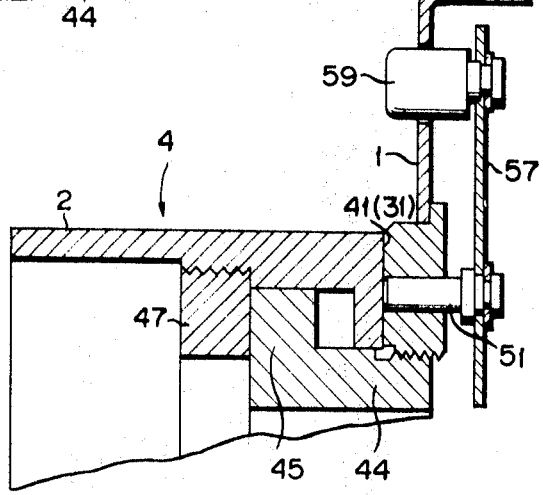
Figure 3C:
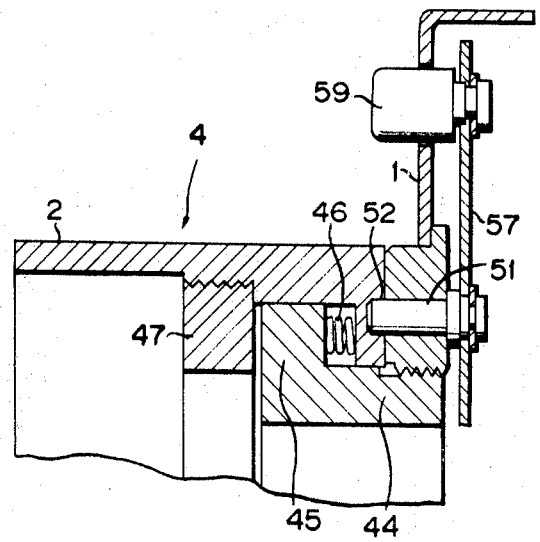

The operation of the coupling device described above will now be considered with reference to FIGS. 3A to 3C. FIG. 3A shows the lens barrel portion 2 before coupling it to the camera body 1. When the lens barrel portion 2 is rotated to gradually mate its screw thread 42 with screw thread 32 until a position is reached less than one full turning before the final coupling position is reached, the abutting surface 41 comes to engage pin 51. Further rotation of the lens barrel portion 2 pushes pin 51 inwardly against the bias of spring 57 and a little before the outer cylindrical member 4 reaches the final coupling position, that is a little before pin 51 drops into the hole 52, abutting surfaces 31 and 41 engage each other. The coupling device is designed such that, at this time the focus of the lens (not shown) contained in the lens barrel portion 2 coincides with the surface of the film contained in the body of the camera. As above described, since pin 51 is projected outwardly by a length less than one pitch of the screw threads, the pin 51 does not drop into the hole 52 before final one full rotation of the lens barrel is performed to define the final coupling position.

After engagement of abutting surfaces 41 and 31 rotation of the lens barrel portion 2 does not cause the axial movement of the outer cylindrical member 4 but merely advances the inner cylindrical member 44 against the tension of coil springs 46. During this operation the force of springs 46 creates a contact pressure between abutting surfaces 41 and 31 thus increasing the coupling force between portions 3 and 4 as the inner cylindrical member 44 is threaded into portion 3. When the hole 52 comes to align with pin 51, pin 51 is pushed into hole 52 thus preventing further rotation of the outer cylindrical member 4. In this manner, irrespective of slight working error in the screw threads the outer cylindrical member 4 is assured to stop and held always at a predetermined axial and circumferential position.

As the inner cylindrical member 44 is yieldingly contained in the outer cylindrical member 4, abutting surfaces 31 and 41 are caused to resiliently engage each other when two portions 3 and 4 are coupled together. As a result, slight difference in the working accuracy of screw threads 32 and 42 can be absorbed by this resident construction so that it is possible to securely mount the lens barrel portion 2 on the camera body accurately at the predetermined axial and circumferential position.

To dismount lens barrel portion 2 from body 1 from the coupled position shown in FIGS. 2 and 3C, the releasing button 59 is depressed to withdraw the pin 51 out of the hole 52 to the rear of the abutting surface 31, and then the outer cylindrical member 4 is rotated in the opposite direction.

When there is no dimensional limitation existing, more commonly the known locking mechanism can be adapted, as described hereinafter. In the embodiments shown in FIGS. 4 to 6, mechanisms other than the locking mechanism, which holds the lens barrel portion 2 and the camera body in the coupled state, are identical to those already described. The locking mechanism shown in FIG. 4 comprises a pair of claws 60 and 61 on the outer periphery of the body side portion 3, and a pin 62 and a pivoted pawl 63 provided on the outer cylindrical member 4 to cooperate with cams. More particularly, claw 60 has a flat side 64 extending in the radial direction of the portion 3 and a slope 65. The other claw 61 has a radial side 66 adapted to engage pin 62 secured to the rear end of the outer cylindrical member 4. However, it is to be understood that the pin 62 is positioned further out from the optical axis than the claw 60 so as not to be arrested by the claw 60 while the lens barrel portion is threaded into the camera side portion 3 but arrested by the flat side 66 of the claw 61 only when the lens barrel portion 4 is coupled to the body side portion 3 at the final coupling position, the amount of engagement of the claws 60 and 66 versus hook 63 and pin 62 in the axial direction being less than one pitch of screw threads 32 and 42. Pawl 63 is pivotally mounted on the rear end of the outer cylindrical member 4 at its center and is provided with a latch 63a on one end adapted to engage claw 60 and a knurled operating member 63b at the other end. The pawl 63 is biased in the clockwise direction by a spring 67.

To couple the lens barrel portion 2 to the camera body 1, the outer cylindrical member 44 is rotated just in the same manner as the previous embodiment. Thus, when the lens barrel portion 2 is threaded into portion 3 to a point near the final coupling position, their abutting surfaces 41 and 31 engage each other, and upon further rotation of the outer cylindrical member pin 62 will engage radial side 66 of the claw 61 while at the same time latch 63a of the pawl 63 will ride up the slope 65 and engage the radial side 64. Thus, the lens barrel portion 2 is locked to the camera body at the predetermined axial and circumferential position.

To dismount the lens barrel portion, the operating portion 63b is depressed to disengage latch 63a from radial side 64 of claw 60 and then the outer cylindircal member 44 is rotated in the opposite direction.

Figure 5:
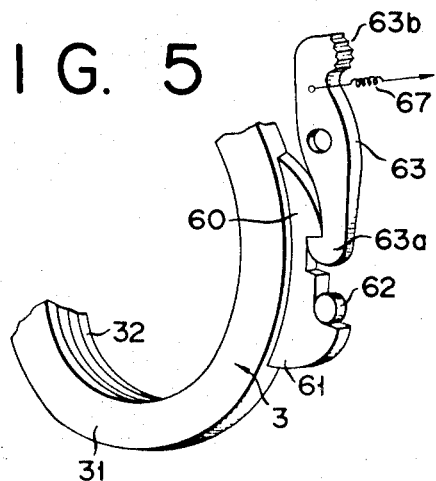
Figure 6:
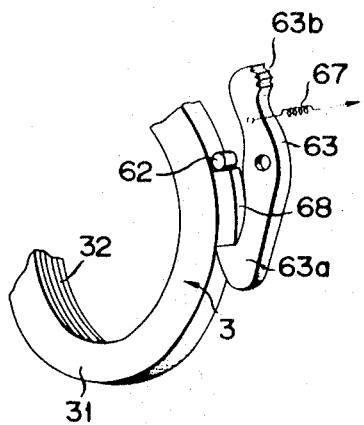

FIGS. 5 and 6 show still other examples of modified locking mechanisms. In the embodiment shown in FIG. 5 cams 60 and 61 are formed as an integral unit whereas in the embodiment shown in FIG. 6, use is made of a single claw 68 with two radial sides. In FIG. 6, the angular positions of pin 62 and latch 63a of the pawl 63 are reversed from those shown in FIG. 5 so that pin 62 and latch 63a engage simultaneously with these radial sides.

Figure 4:
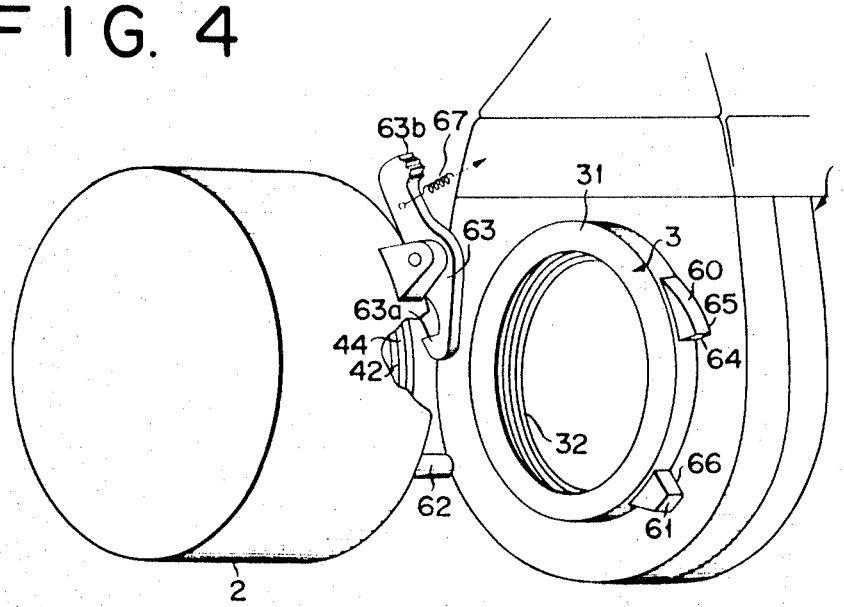
FIGS. 4 to 6 are perspective views of modified embodiments of the stop mechanism.

It will be clear that modifications shown in FIGS. 4 to 6 operate in the same manner as that shown in FIGS. 1 to 3.

Figure 7:
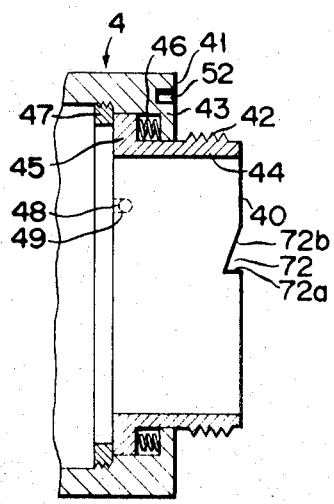
FIG. 7 shows a longitudinal section of another embodiment.

In the modified embodiment shown in FIGS. 7 to 9 a notch 72 is provided on the rear end 40 of the inner cylindrical member 44 having a longitudinal side 72a and an inclined side 72b. A similar notch 73 is formed on the rear end 30 of the body side portion 3. There is also provided a leaf spring 74 fixed at one end to the body and carrying a claw member 71 at the free end having a longitudinal side 71a and an inclined side 71b. The claw member 71 is positioned such that when the lens barrel portion 2 is threaded into the final coupling position the claw member 71 will be received in the notch 72 of the inner cylindrical member 44 as will be described hereinafter.

FIG. 9A shows the condition of parts when the lens barrel portion 2 is disengaged from the body 1. Under these circumstances the claw member 71 is urged by leaf spring 74 to engage notch 73 on the rear end surface 30 of the camera body side portion 3. When the inner cylindrical member 44 is advanced to a point one pitch before the final coupling position member 44 assumes a position indicated by dotted lines in FIG. 9B. Upon further advance of the inner cylindrical member 44, its rear surface 40 comes to engage cam member 71 to push it towards right against the bias of spring 74. At the final coupling position, claw member 71 drops in notch 72 to prevent further rotation of the member 44. Since the height of claw member 71 is less than one pitch of screw threads 32 and 42, it will not engage notch 72 before the inner cylindrical member reaches the final coupling position. Further, since inclined sides 72b and 71b of notch 72 and claw member 71 are inclined in the same direction, it is free to rotate the lens barrel portion in the opposite direction for dismounting.

By the incorporation of the stop mechanism shown in FIGS. 7 and 8 into the embodiment shown in FIGS. 1 to 3 it is possible to prevent excessive advance of the lens barrel portion beyond the final coupling position or to prevent such excessive advance when the outer cylindrical member is inadvertently rotated after the release button has been operated.

It is to be noted that the notch 73 on the rear end 30 of the body side portion 3 may be omitted and that even when the notch 73 is eliminated it is necessary to determine the height of the claw member 71 to be less than one pitch of the screw threads.

Prevention of further advance of lens barrel portion beyond the final coupling position can also be attained by the stop arrangements shown in FIGS. 10 and 11. More particularly, in the arrangement shown in FIGS. 10A to 10F, an inclined surface 511 inclining in the direction of rotation in which the lens barrel portion is advanced is provided on the top of the pin 51 identical to that utilized in the first embodiment. Pin 51 is mounted such that upon depression of release button 59, pin 51 will not be perfectly retracted into portion 3 but instead only a portion of the inclined surface 511 will be retracted from the abutting surface 31. FIG. 10A shows the relative position of the outer cylindrical member 4 and the body side portion 3 when they are at a position one pitch before the final coupling position. As been described in connection with the first embodiment, a little before the final position abutting surfaces 41 and 31 come to engage and pin 51 is retracted against the bias of leaf spring 57, as shown in FIG. 10B. As the outer cylindrical member 4 is rotated further, pin 51 which is biased by the spring 57 shown in FIGS. 3A to 3C is gradually protruded into the hole 52 by the action of its inclined surface 511 as shown in FIG. 10C until finally the side surface 512 adjacent the highest portion of pin 51 comes to engage right hand wall 522 of the hole 52 at which time the pin is fully protruded into the hole as shown in FIG. 10D. Under these circumstances rotation of the lens barrel is positively prevented in either direction.

In this manner, as the pin 51 is partially protruded into the hole 52 before reaching the final coupling position it is possible to positively prevent passing of the hole 52 over the pin 51 thus causing excessive advance of the lens barrel and to positively stop the rotation of the lens barrel at the predetermined final position.

Figure 10A:
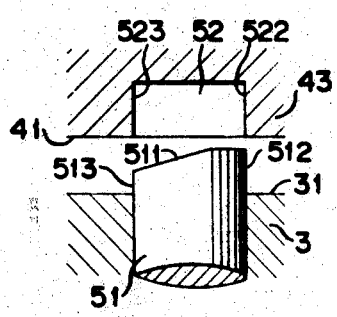
FIGS. 10A to 10F are partial sectional views to explain the construction and operation of a modified stop mechanism.
Figure 10B:
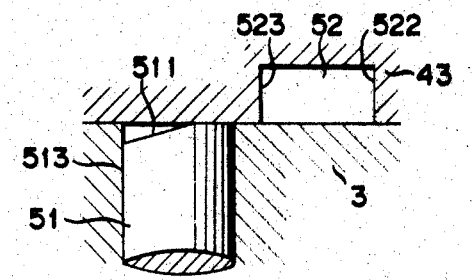
Figure 10C:
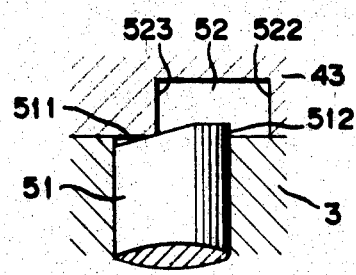
Figure 10D:
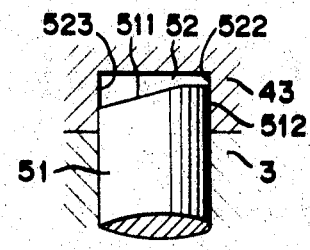
Figure 10E:
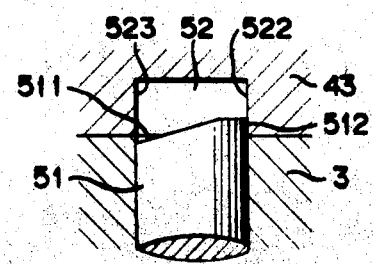
Figure 10F:
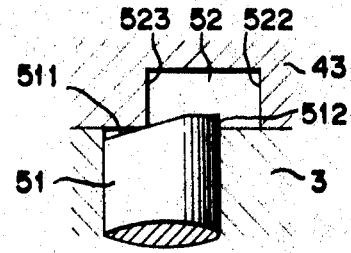

FIG. 10E shows the position of pin 51 when the release button 59 is depressed. In this position inclined surface 511 is only partially retracted from the abutting surface 31 thus preventing inadvertent rotation of the lens barrel in the coupling direction. However, the inclined surface 511 permits rotation of the lens barrel in the opposite or dismounting direction shown by the arrows in FIGS. 10E and 10F. As the lens barrel is rotated in this direction, pin 51 will be gradually retracted. Once the pin has been perfectly retracted continued rotation of the lens barrel 2 removes it from body 1.

In another embodiment shown in FIG. 11 the upper surface 514 of pin 51 is inclined in the direction opposite to that of the embodiment shown in FIG. 10, thus permitting rotation of the outer cylindrical member 4 in the coupling direction. Another set of stop mechanism is provided including a pin 53 normally protruded from the abutting surface 31 by a spring 531 and a recess 54 cooperating with pin 53 and having one side inclined in the direction opposite to that of the top of the pin 51.

FIG. 11A shows a position at which the lens barrel is at a position one pitch before the final coupling position. As the lens barrel is further rotated in the direction of arrow abutting surfaces 31 and 41 are caused to engage by the means shown in the first embodiment thus depressing both pins 51 and 53 by abutting surface 41 as shown in FIG. 11B. As the rotation of the lens barrel is continued pin 51 begins to protrude into the recess 54 along its inclined surface 541 as shown in FIG. 11C and thereafter pin 53 begins to protrude into the recess 54 along the same inclined surface while at the same time pin 51 begins to retract because of its inclined surface 514 as shown in FIG. 11D. After complete retraction as shown in FIG. 11E, pin 51 protrudes into the hole 52 as shown in FIG. 11F. In this manner, pin 51 engages the hole 52 after freely passing by recess 54 but as pin 53 is not provided with an inclined surface at its free end it is arrested by recess 54 as shown in FIG. 11F thus preventing any further rotation of the lens barrel in the coupling direction. At the same time the lens barrel 2 cannot be turned back because of the engagement between the pin 51 and the hole 52, thus the lens barrel is caught and locked in that position.

To dismount the lens barrel, it is rotated in the opposite direction after depression of the release button 59 to retract pin 51. In this case, further rotation of the lens barrel to be screwed in is impossible, prevented by the engagement between the pin 53 and the vertical side of the recess 54, but the adverse rotation is possible, because the pin 53 is pushed down by the inclined surface 541 of the recess 54 as the lens barrel is screwed out.

Although in the above described embodiments the abutting surface 41 was formed at the rear end of the outer cylindrical member 4 of the lens barrel and the threaded inner cylindrical member was resiliently mounted on the outer cylindrical member, the inner and outer cylindrical members may be constructed as an integral member and a threaded member may be resiliently mounted on the body side member 3 with abutting surface 31. In the same manner, the relative position of the pin 51 and the hole 52 may be reversed.

What is claimed is:

1. A threaded type coupling device for mounting a lens barrel on a camera body comprising a first hollow cylindrical member secured to said camera body, an outer end surface of said cylindrical member forming an abutting surface perpendicular to the optical axis of the camera; a second hollow cylindrical member secured to said lens barrel or constructed as a part of the lens barrel, an outer end surface of said second cylindrical member also forming an abutting surface perpendicular to said optical axis; a third hollow cylindrical member which is received in either one of said first and second cylindrical members to be movable in the direction of said optical axis but not in the circumferential direction; said third cylindrical member and either one of said first and second cylindrical members which does not contain said third cylindrical member being provided with mating screw threads; and resilient means for biasing said third cylindrical member in the direction of said optical axis with respect to the first or second cylindrical member which has said third cylindrical member such that when said screw threads are mated to couple together said first and second cylindrical members at a predetermined point along said optical axis, the abutting surfaces of said first and second cylindrical members are made to slide so as to contact each other under increasing pressure, starting from a point within one turn of said screw threads before said predetermined circumferential point is reached.

2. The coupling device according to claim 1 which further comprises a catching means of which one part is mounted on the cylindrical member not including said third cylindrical member, the other part is mounted on said third cylindrical member or the cylindrical member having said third cylindrical member and the axial amount of engagement of said catching means being less than one pitch of said screw threads.

3. The coupling device according to claim 2 wherein said catching means comprises a pin provided in either one of said first and second cylindrical members, resilient means to project said pin from the abutting surface of one of the cylindrical members mounted on a hole provided in the abutting surface of the other of said cylindrical members to receive said pin, and manually operated means to disengage said pin from said hole.

4. The coupling device according to claim 3 which further comprises a notch on the end surface of one of said three cylindrical members, said notch having a radial flat surface parallel to the optical axis, and a projection mounted on said body or lens barrel with which the notch is provided, said projection resiliently protruding into said notch by a length less than one pitch of said screw threads and being provided with a flat plane adapted to engage said radial flat surface of said notch.

5. The coupling device according to claim 3 wherein the free end surface of said pin is inclined backward with respect to the direction in which said cylindrical member having said hole is screwed in toward said predetermined point and said pin is only partially retracted by the manual operation of said disengaging means such that a portion of said inclined surface still protrudes from said abutting surface.

6. The coupling device according to claim 3 wherein the free end surface of said pin is inclined forward with respect to the direction in which said cylindrical member with the hole is screwed in, and which further comprises a second recess and a second pin provided with either of said first and second cylindrical members, the depth of said second recess decreasing in the direction of rotation of said cylindrical member having said second recess when the same is advanced toward said predetermined position and said second pin elastically protruding into said second recess from said abutting surface by a length less than one pitch of said screw threads.

References Cited

UNITED STATES PATENTS

| | | | |
|---|---|---|---|
| 2,756,633 | 7/1956 | Brandes et al. | 350—252 X |
| 2,830,513 | 4/1958 | Sauer | 95—44 X |
| 3,388,647 | 6/1968 | Yajima | 95—44 X |

SAMUEL S. MATTHEWS, Primary Examiner

R. A. WINTERCORN, Assistant Examiner

U.S. Cl. X.R.

350—252, 255